United States Patent
Chen

(10) Patent No.: US 11,329,421 B2
(45) Date of Patent: May 10, 2022

(54) CHARGING PLUG

(71) Applicant: Jui Lung Chen, New Taipei (TW)

(72) Inventor: Jui Lung Chen, New Taipei (TW)

( * ) Notice: Subject to any disclaimer, the term of this patent is extended or adjusted under 35 U.S.C. 154(b) by 52 days.

(21) Appl. No.: 16/928,015

(22) Filed: Jul. 14, 2020

(65) Prior Publication Data

US 2022/0021151 A1    Jan. 20, 2022

(51) Int. Cl.
| | |
|---|---|
| *H01R 13/44* | (2006.01) |
| *H01R 13/52* | (2006.01) |
| *H02J 7/00* | (2006.01) |
| *H01R 13/512* | (2006.01) |
| *B60R 16/02* | (2006.01) |

(52) U.S. Cl.
CPC ......... *H01R 13/5213* (2013.01); *B60R 16/02* (2013.01); *H01R 13/44* (2013.01); *H01R 13/512* (2013.01); *H02J 7/0045* (2013.01); *H01R 2201/26* (2013.01)

(58) Field of Classification Search
CPC .. H01R 13/5213; H01R 13/44; H01R 13/512; H01R 2201/26; B60R 16/02; H02J 7/0045
See application file for complete search history.

(56) References Cited

U.S. PATENT DOCUMENTS

| | | | | |
|---|---|---|---|---|
| 4,629,268 A | * | 12/1986 | Hiles | B60D 1/64 |
| | | | | 439/136 |
| 5,573,412 A | * | 11/1996 | Anthony | H01R 13/5213 |
| | | | | 220/242 |
| 5,993,266 A | * | 11/1999 | Mayer | H01R 13/5213 |
| | | | | 439/294 |
| 11,146,029 B1 | * | 10/2021 | Shaffer | H01R 13/5213 |
| 2007/0012474 A1 | * | 1/2007 | McNutt | H01R 13/5213 |
| | | | | 174/135 |
| 2011/0189885 A1 | * | 8/2011 | Tsai | H01R 13/701 |
| | | | | 439/488 |
| 2015/0207533 A1 | * | 7/2015 | Ferraro | H01R 24/64 |
| | | | | 455/558 |
| 2017/0288335 A1 | * | 10/2017 | Hsu | G02B 6/3825 |
| 2018/0309248 A1 | * | 10/2018 | Chen | H01R 13/5213 |

FOREIGN PATENT DOCUMENTS

CN        111430974     *  3/2021   ......... H01R 13/5213

* cited by examiner

*Primary Examiner* — Tho D Ta

(57) ABSTRACT

A charging plug for high-current charging equipment, the upper end face of main body is provided with an abutting hole corresponding to the socket, and the conducting strips are partially exposed in the abutting hole. A boss extends transversely along the edge of abutting hole in the main body. The charging plug is provided with a protective cover. The protective cover comprises a cover body matching the abutting hole, a collar part fitted over main body and an interconnecting piece connecting the cover body with collar part.

7 Claims, 6 Drawing Sheets

CHARGING PLUG

BACKGROUND OF INVENTION

1. Field of the Invention

The present invention relates generally to a plug product, and more particularly to a charging plug for high-current charging equipment.

2. Description of Related Art

The high-end vehicles, such as recreational vehicles and yachts, are equipped with high capacity batteries, and are powered by their electrical equipment. After a period of operation, these batteries need to be charged to guarantee normal operation. The conventional operation mode is that the battery is connected to the power equipment for charging by a charging cable, one end of the charging cable is provided with a plug which corresponds to the charging pile socket. As this kind of charging equipment has high charging current, and the plug and socket are fitted tightly, a strong external force is required for plugging or pulling action. Therefore, this kind of charging plug structure design is relatively complex, and the production cost is higher.

Another problem, the charging cable in recreational vehicles and yachts is not always in operating state, it shall be stored in non-charging condition. As this kind of charging plug has an abutting plug hole for abutting the charging socket, and when the charging cable is being stored, some foreign matter may enter the abutting plug hole, conductively connecting the metal inserts in the abutting plug hole. If the user plugs it into the charging socket unknowingly, there may be a short circuit, generating sparks, even more dangerous conditions.

SUMMARY OF THE INVENTION

The technical problem to be solved by the invention is to overcome the above problems and provide a charging plug with a simple structure and safety protection.

In order to solve the above technical problems, the present invention adopts the following technical solutions:

A charging plug, comparing: a main body, conducting strips fixed in the main body and a wire cable connected to the main body; wherein an upper end face of the main body is provided with an abutting hole matching the socket, the conducting strips are partially exposed in the abutting hole, a boss extending transversely along an edge of the abutting hole of the main body; a protective cover, which includes a cover body matching the abutting hole, a collar part fitted over the main body and an interconnecting piece connecting the cover body to the collar part; the protective cover provided on the main body can seal the abutting hole with the cover body when the charging plug is not in use.

More particularly, wherein the boss is uniformly provided with first attachment holes, the collar part is provided with second attachment holes corresponding to the first attachment holes, the collar part is fixed to a lower part of boss by screws or rivets and the first attachment holes and the second attachment holes.

More particularly, where the cover body includes a cover abutting part which can be inserted into the abutting hole and a cover edge in larger diameter than the diameter of the abutting hole formed with the cover abutting part in one.

More particularly, wherein a seal groove is provided in a surface of the cover abutting part.

More particularly, wherein a screwed flange is formed upwards along the edge of abutting hole of the main body.

More particularly, wherein a fastening spacing hole is formed in a surface of the screwed flange.

More particularly, wherein a support base is disposed in the main body, the conductive insert is provided with three pieces, and the three conducting strips are equiangularly distributed and fixed to the support base.

More particularly, wherein the conducting strip includes a contact part exposed in the abutting hole, a connecting portion connected to the corresponding conductor in the wire cable, and a fixed portion between contact part and connecting portion, at least one conducting strip has a flanged edge.

More particularly, wherein an inner ring is tightly fitted in the abutting hole, a guide groove is formed in the inner wall of the inner ring.

More particularly, wherein a lower end of the inner ring is fixed to the support base, and a conducting strip is fixed to an edge of the support base, a lower end of the conducting strip is connected to the corresponding conductor in the wire cable, an upper end of the conducting strip abuts on the inner wall of inner ring.

In comparison to the existing technology, the present invention has the following benefits:

1. The present invention adds a protective cover to the existing product, the protective cover can close the abutting hole of charging plug in non-operating state, so as to prevent water, insects and impurities from entering the abutting hole to avoid short circuit in operation.

2. The present invention has a simple structure, the main body of plug is made by integrative injection molding of a plastic material with certain pliability, the conducting strips in the plug are fixed by a rigid support base, and wrapped in the main body by integrative injection molding, so that the whole plug forms one unit, the product surface is free of assemblage gaps, the rainwater will not enter the plug, and the overall product structure is steadier, the service life is longer.

3. A boss extends transversely from the edge of abutting hole, as the boss diameter is apparently larger than the diameter of abutting hole, when the charging plug abuts the socket for charging, the end face of boss abuts on the surface of charging socket to resist water, even if in a rainy day, the rainwater can be prevented from entering the abutting hole.

DETAILED DESCRIPTION OF THE INVENTION

Figure 1:
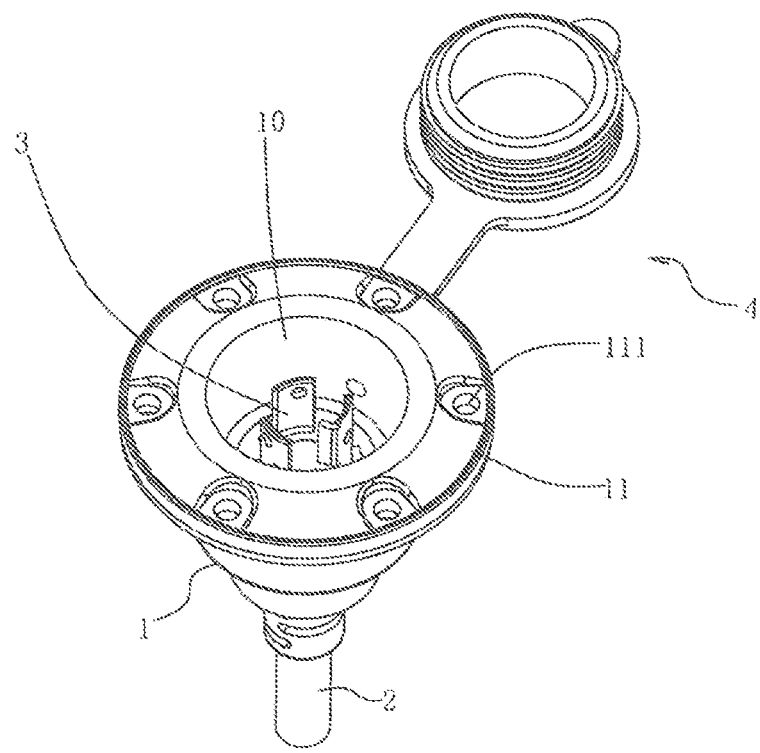
FIG. 1 is a stereogram of Embodiment 1 of the present invention.
Figure 2:
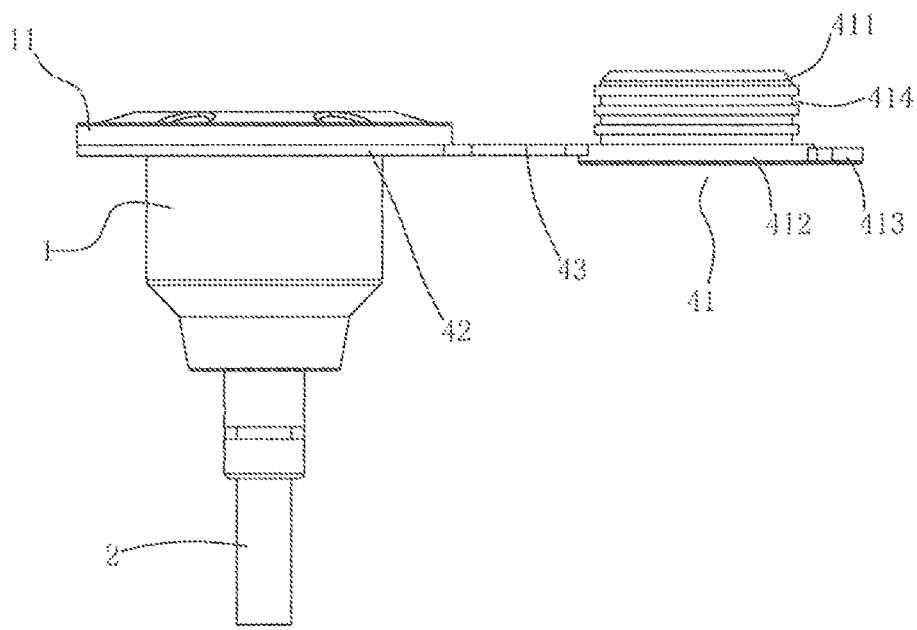
FIG. 2 is a front view of Embodiment 1 of the present invention.

The present invention is a high-current charging plug for charging the storage batteries of such vehicles as recreational vehicles, yachts and so on.

FIGS. 1 to 4 show Embodiment 1 of the present invention, comprising a main body 1, a wire cable 2, conducting strips 3, a protective cover 4 and a support base 5.

The main body 1 is made of a plastic material with certain pliability, e.g. PVC injection molding. The upper end face of main body 1 is provided with an abutting hole 10 matching the charging socket. The conducting strips 3 are partially exposed in the abutting hole 10. A boss 11 extends transversely along the edge of abutting hole 10 on the upper end face of the main body 1. As shown in FIG. 1, the boss 11 rises slightly, thus, when the charging plug abuts the charging socket, the upper surface of boss 11 of charging plug can adhere to the surface of charging socket, there will be no gap between them, resisting rainwater.

The lower end of the main body 1 is fixed to wire cable 2. The wire cable 2 is usually made of rubber material, the main body 1 and wire cable 2 are consolidated by integrative injection molding. The wire cable 2 contains conductors abutting the conducting strips 3 (not disclosed in FIGS.).

Figure 4:
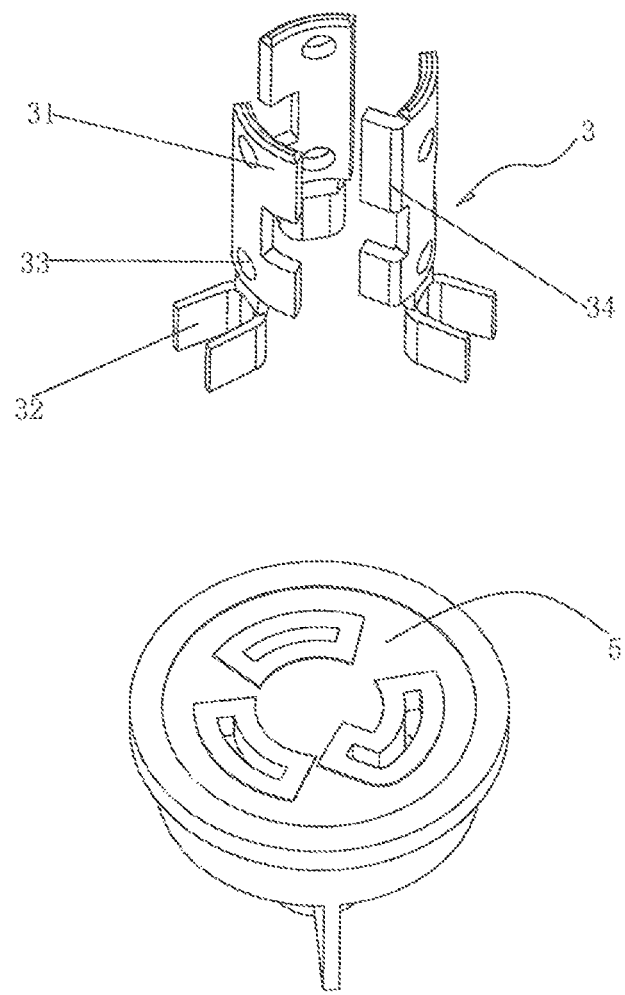
FIG. 4 is a three-dimensional exploded diagram of support base and conducting strips in Embodiment 1 of the present invention.

As shown in FIG. 4, the conducting strips 3 are made of metal material, generally copper sheet. Generally, a charging plug is provided with three conducting strips 3. A support base 5 is disposed in main body 1. The three conducting strips 3 are equiangularly distributed and fixed to the support base 5. Each of the conducting strips 3 comprises a contact portion 31 exposed in the abutting hole 10, a connecting portion 32 connected to the corresponding conductor in wire cable 2, and a fixed portion 33 between contact portion 31 and connecting portion 32. In addition, to avoid inserting errors, foolproof design is usually used for at least one conducting strip 3. In terms of the foolproof design in this case, a conducting strip 3 is provided with a flanged edge 34. Thus, the plug can be inserted only at a specific angle, preventing wrong inserting.

The support base 5 is made of plastic material, e.g. PVC material. The first step of production is to connect the conducting strips 3 to the corresponding conductors in the wire cable 2, and then the conducting strips 3 are fixed to the support base 5 by integrative injection molding. After the support base 5 is completed, the support base 5 integrated with conducting strips 3 is integrated with main body 1 by integrative injection molding.

The charging plug has a protective cover 4, the protective cover 4 comprises a cover body 41 matching the abutting hole 10, a collar part 42 fitted over main body 1 and an interconnecting piece 43 connecting the cover body 41 with the collar part 42. The cover body 41 comprises a cover abutting part 411 which can be inserted into the abutting hole 10, and a cover edge 412 in larger diameter than the diameter of abutting hole 10 which is molded with cover abutting part 411 in one. The protective cover 4 is fitted over the main body 1 through collar part 42. Thus, the protective cover 4 can seal the abutting hole 10 with the cover body 41 when the charging plug is in non-operating state, so as to prevent water, insects and foreign matter from entering the abutting hole to avoid short circuit in operation.

To further enhance the waterproof effect, a seal groove 414 is made in the surface of the cover abutting part 411.

Figure 3:
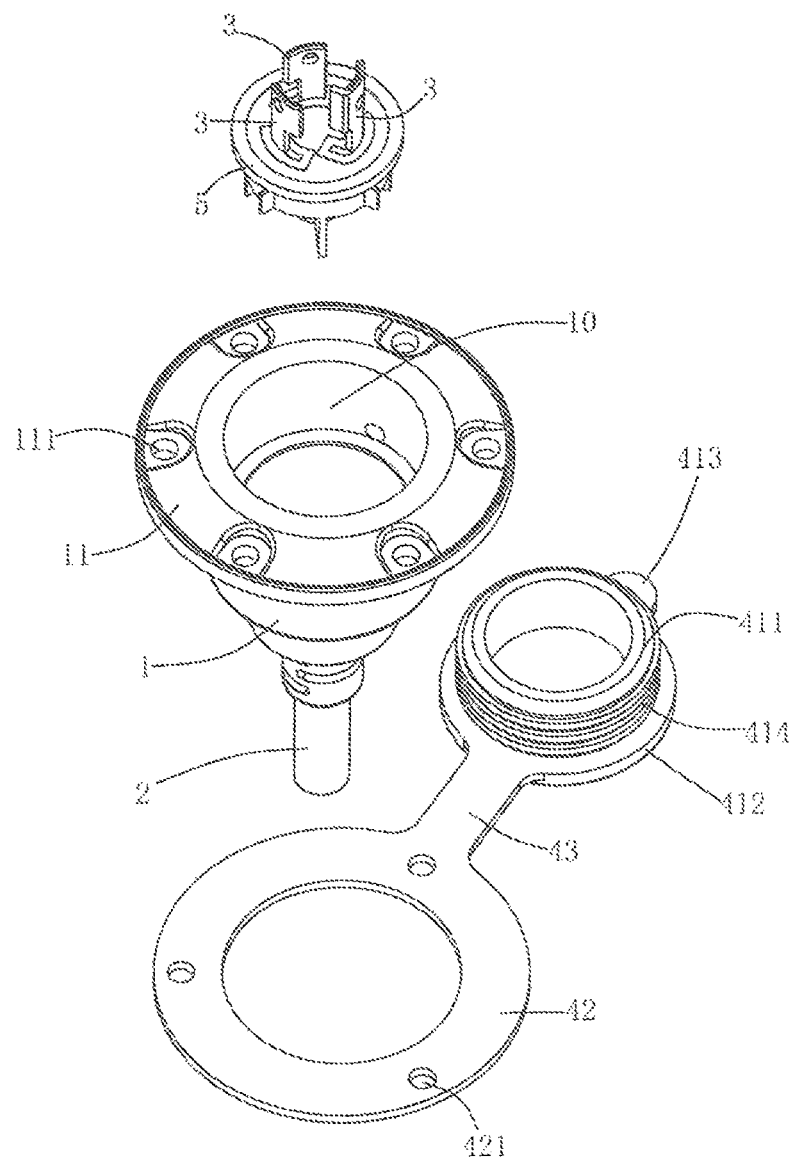
FIG. 3 is a three-dimensional exploded diagram of Embodiment 1 of the present invention.

Certainly, the protective cover 4 can be fixed to main body 1. As shown in FIG. 3, the boss 1 of the main body 1 is uniformly provided with first attachment holes, the collar part 42 is provided with second attachment holes 421 corresponding to the first attachment holes 111, the collar part 42 is fixed to the lower part of boss 1 by screws or rivets (not disclosed in FIGS.) and the coordination of first attachment holes 1111 and second attachment holes 421.

Figure 5:
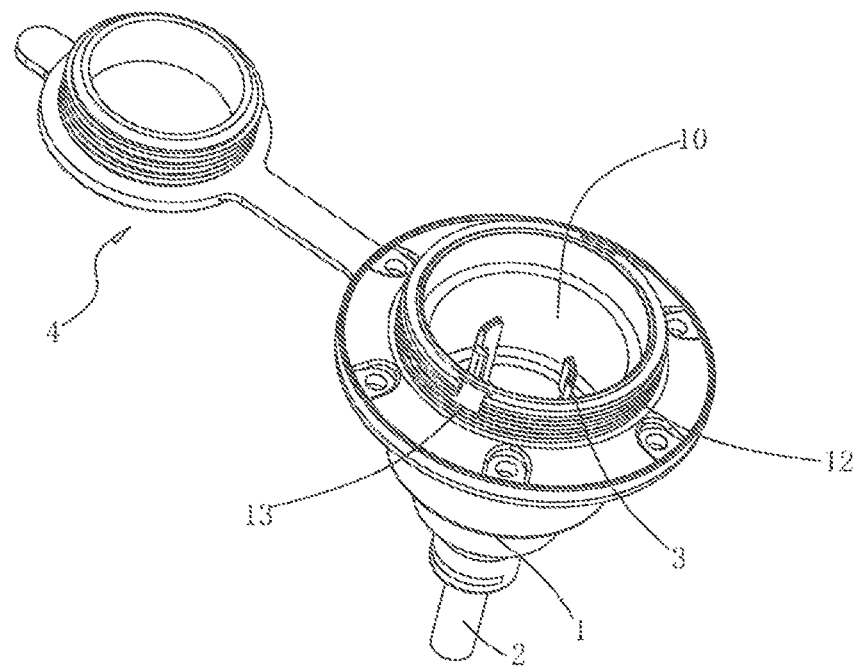
FIG. 5 is a stereogram of Embodiment 2 of the present invention.

FIG. 5 shows the Embodiment 2 of the present invention. The difference from the aforethe Embodiment 1 is that in this case, a screwed flange 12 is formed upwards along the edge of abutting hole 10 on the upper end face of main body 1. This design forms stable connection between the whole charging plug and charging socket as the screwed flange 12 coordinates with the corresponding threaded hole in the charging socket, guaranteeing the stability of connection in the charging process. In addition, to avoid accidental disengagement of charging plug from the charging socket, a fastening spacing hole 13 is formed in the surface of the screwed flange 12, the fastening spacing hole 13 coordinates with the stop lug in the charging socket, further guaranteeing the stability of connection.

Figure 6:
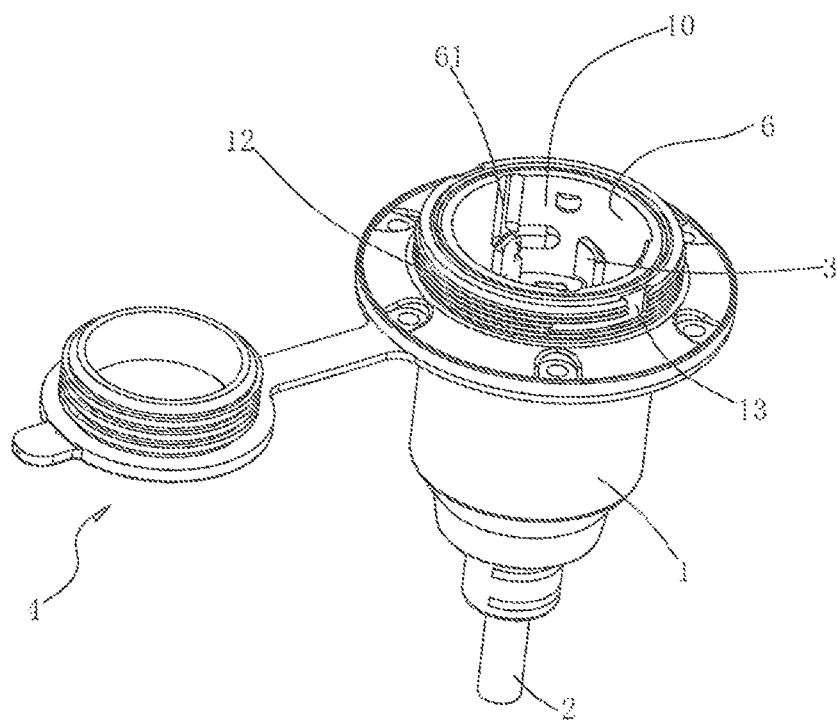
FIG. 6 is a stereogram of Embodiment 3 of the present invention.
Figure 7:
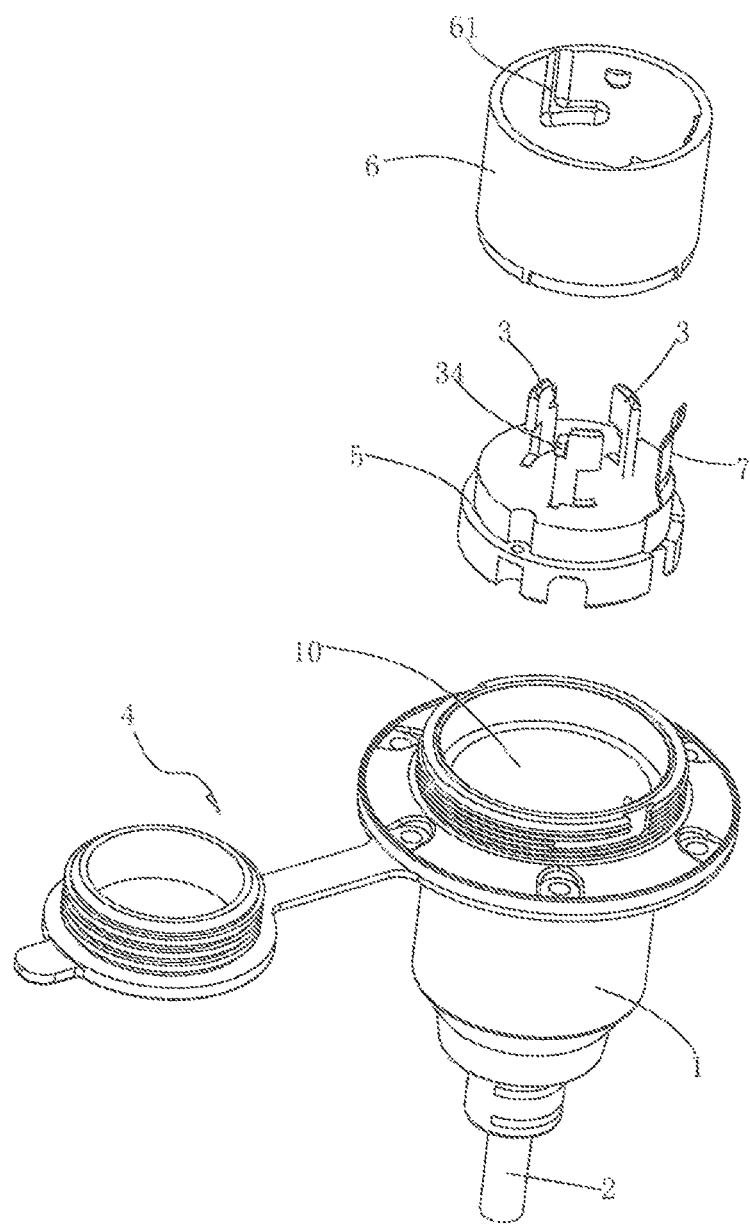
FIG. 7 is a three-dimensional exploded diagram of Embodiment 3 of the present invention.

FIG. 6 and FIG. 7 show the Embodiment 3 of the present invention. The difference from the above Embodiment 2 is that in this case, an inner ring 6 is tightly fitted in the abutting hole 10. A guide groove 61 is formed in the inner wall of the inner ring 6. The lower end of the inner ring 6 is fixed to the support base 5, and a conducting strip 7 is fixed to the edge of support base 5. The lower end of the conducting strip 7 is connected to the corresponding conductor in the wire cable 2. The upper end of conducting strip 7 abuts on the inner wall of inner ring 6.

In this case, the wire cable of charging plug has four conductors, the conducting strip 7 is an additional connecting terminal, when the charging plug abuts the charging socket, the conducting strip 7 contacts the corresponding conductive terminal in the charging socket, forming conductive connection.

An inner ring 6 is created in this case, the inner ring 6 can be made of a rigid plastic material, which can support the inserting hole 10, so that the inserting hole 10 will not deform and fail to abut the charging socket. In addition, to guarantee stable connection between the charging plug and charging socket in the charging process, a guide groove 61 is formed in the inner wall of inner ring 6. The guide groove 61 will coordinate with the corresponding lug in the charging socket to form a buckle connection.

Figure 8:
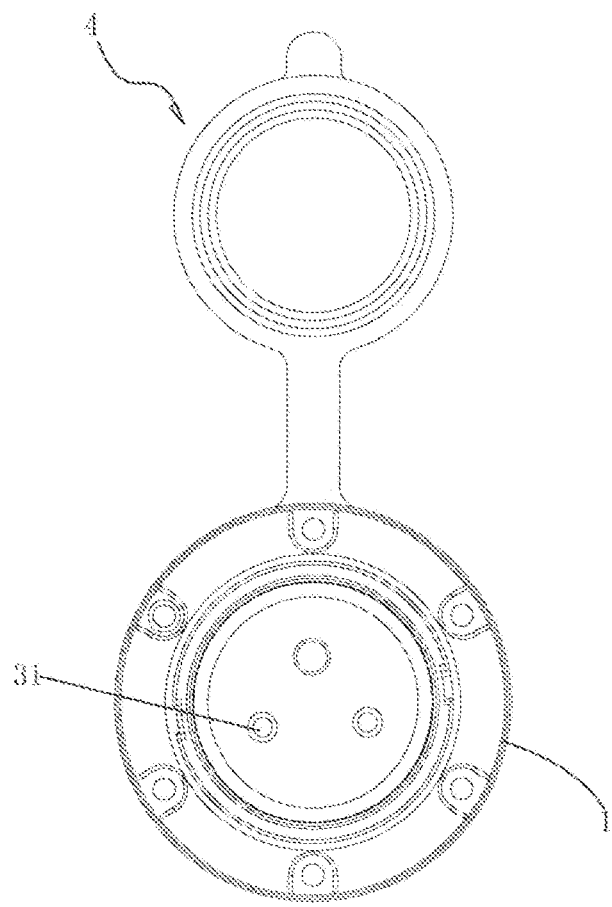
FIG. 8 is a top view of Embodiment 4 of the present invention.
Figures 9, 10:
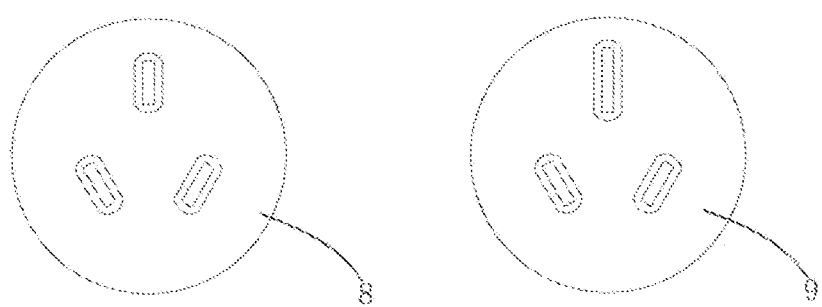
FIGS. 9 and 10 are schematic diagrams of sockets in other applications of the present invention.

Different countries and regions have different standards for the conducting strips of plugs and sockets, the present invention can change the shape of conducting strips for adaptation. FIG. 8 is the top view of Embodiment 4 of the present invention. In this case, the contact portion 31 of conducting strips 3 is cylindrical, the other portions of conducting strips 3 can be designed referring to the aforethe embodiments, which are not detailed anymore. Certainly, the conducting strips 3 can be designed according to different conditions, for example, FIG. 9 and FIG. 10 show the socket 9 in other applications of the present invention, the conducting strips corresponding to this kind of socket 9 shall be adjusted accordingly.

I claim:

1. A charging plug, comparing:
a main body (1), conducting strips (3) fixed in the main body (1) and a wire cable (2) connected to the main body (1); wherein an upper end face of the main body (1) is provided with an abutting hole (10) matching a socket, the conducting strips (3) are partially exposed in the abutting hole (10), a boss (11) extending transversely along an edge of the abutting hole (10) of the main body (1);

a protective cover (4), which includes a cover body (41) matching the abutting hole (10), a collar part (42) fitted over the main body (i) and an interconnecting piece (43) connecting the cover body (41) to the collar part (42);

the protective cover (4) provided on the main body (1) can seal the abutting hole (10) with the cover body (41) when the charging plug is not in use;

wherein a support base (5) is disposed in the main body (1), a conductive insert (3) is provided with three pieces, and the three conducting strips (3) are equiangularly distributed and fixed to the support base (5);

wherein an inner ring (6) is tightly fitted in the abutting hole (10), a guide groove (61) is formed in the inner wall of the inner ring (6);

wherein a lower end of the inner ring (6) is fixed to the support base (5), and a conducting sheet (7) is fixed to an edge of the support base (5), a lower end of the conducting sheet (7) is connected to the corresponding conductor in the wire cable (2), an upper end of the conducting sheet (7) abuts on the inner wall of inner ring (6).

2. The charging plug defined in claim 1, wherein the conducting strip (3) includes a contact part (31) exposed in the abutting hole (10), a connecting portion (32) connected to the corresponding conductor in the wire cable (2), and a fixed portion (33) between contact part (31) and connecting portion (32), at least one conducting strip (3) has a flanged edge (34).

3. The charging plug defined in claim 1, wherein the boss (11) is uniformly provided with first attachment holes (111), the collar part (42) is provided with second attachment holes (421) corresponding to the first attachment holes (111), the collar part (42) is fixed to a lower part of boss (11) by screws or rivets and the first attachment holes (1111) and the second attachment holes (421).

4. The charging plug defined in claim 3, where the cover body (41) includes a cover abutting part (411) which can be inserted into the abutting hole (10) and a cover edge (412) in larger diameter than the diameter of the abutting hole (10) formed with the cover abutting part (411) in one.

5. The charging plug defined in claim 4, wherein a seal groove (414) is provided in a surface of the cover abutting part (411).

6. The charging plug defined in claim 1, wherein a screwed flange (12) is formed upwards along the edge of abutting hole (10) of the main body (1).

7. The charging plug defined in claim 6, wherein a fastening spacing hole (13) is formed in a surface of the screwed flange (12).

* * * * *